United States Patent [19]

Liu et al.

[11] Patent Number: 5,003,210

[45] Date of Patent: Mar. 26, 1991

[54] STATOR AND BEARING FOR SUBMERSIBLE PUMP MOTOR

[75] Inventors: Joseph C. Liu, Tulsa; Donald C. Watson, Broken Arrow, both of Okla.

[73] Assignee: Oil Dynamics, Inc., Tulsa, Okla.

[21] Appl. No.: 453,682

[22] Filed: Dec. 20, 1989

[51] Int. Cl.[5] ............................................. H02K 5/16
[52] U.S. Cl. ...................................... 310/87; 310/90
[58] Field of Search .................... 277/136; 310/87, 90, 310/42; 384/218, 906

[56] References Cited

U.S. PATENT DOCUMENTS

| | | | |
|---|---|---|---|
| 641,106 | 1/1900 | Hawksworth | 384/906 |
| 4,046,432 | 9/1977 | Hofmann et al. | 384/906 |
| 4,435,661 | 3/1984 | Witten | 310/87 |
| 4,513,215 | 4/1985 | Del Serra | 310/90 |
| 4,521,708 | 6/1985 | Vandevier | 310/87 |

Primary Examiner—Steven L. Stephan
Assistant Examiner—D. L. Rebsch
Attorney, Agent, or Firm—Head & Johnson

[57] ABSTRACT

A submersible motor includes a stator section along the entire length of rotor sections attached to the motor shaft, and a non-magnetic rotor bearing and sleeve assembly between each rotor section, with the rotor bearing being releasable but normally interconnected with the stator to prevent its rotation relative to the sleeve which rotates with the motor shaft.

10 Claims, 3 Drawing Sheets

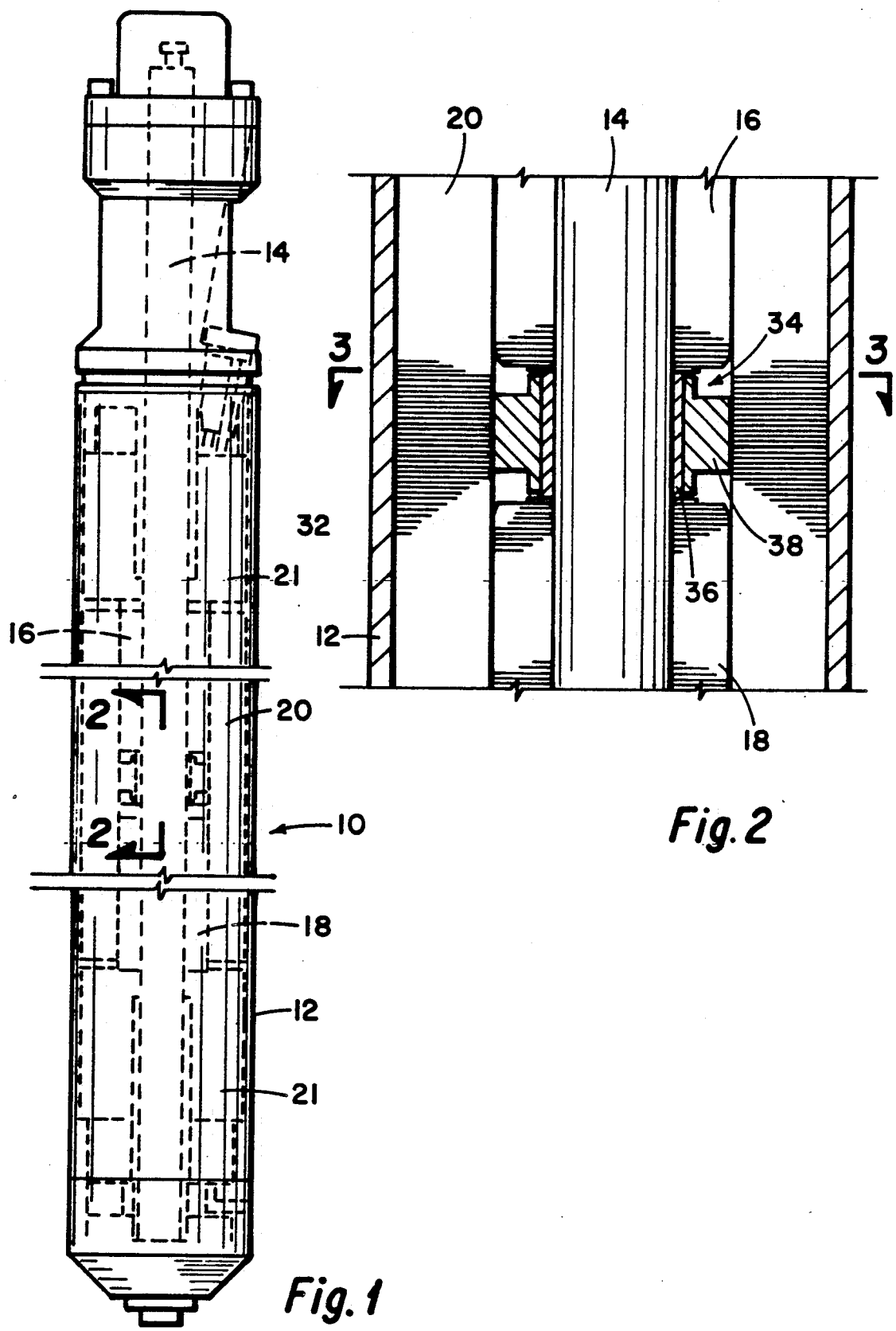

STATOR AND BEARING FOR SUBMERSIBLE PUMP MOTOR

BACKGROUND OF THE INVENTION

The field of this invention encompasses submersible motors used to pump fluids from subterranean formations.

The stator and rotor are constructed in sections. Each section of steel is called a core and delivers a certain output (HP). In the stator, a stack (1.75") of bronze laminations is necessary between two steel cores. This bearing stack is known as bearing lamination.

The rotor bearings are typically made of nitralloy material. The motor is assembled so that these bearings operate in the bronze bearing lamination sections. When the motor is at room temperature, there is a small gap between the rotor bearing OD and bearing lamination ID for easy assembly 5 and disassembly of the rotor cores and bearings relative to the stator.

As the motor temperature increases during operation, the bronze laminations with a higher thermal expansion coefficient, first expand outward—until the OD expansion is stopped by the motor housing—then grow inward (reducing the bronze lamination ID) to grasp the rotor bearings. The timing is critical. If the bearings are grasped before the shaft and rotors are fully expanded axially, a bearing failure will occur.

Since the motor winding goes through these bronze bearing laminations, a magnetic field is produced when the motor winding is energized. However, since the bronze is a nonmagnetic material, it acts as a large air gap so that the flux (magnetic lines) actually transferred through the nitralloy bearing is very limited even though the nitralloy is magnetic. With the present design, the bearing could spin until a certain operating temperature is reached.

SUMMARY OF THE INVENTION

It is an object of this invention to provide an improved rotor bearing assembly for use between rotors of a submersible electric motor.

Specifically, the invention is directed to a submersible electric motor that has particular application in producing fluids from subterranean formations, particularly oil bearing formations. The motor comprises a substantially oil-filled housing within which a shaft is rotatably supported by appropriate bearings as is well known in the art. The shaft is then connectable to a centrifugal pump and/or equipment normally found in submersible motor/pump systems. The motor typically includes a plurality of spaced rotors that are attached to the shaft. The stator section extends the full length of all of the rotors so as to surround them, with the stator section being attached to the housing and, comprising a plurality of stacked laminated plates. Each of the plates which have typically been utilized in the prior art comprise a circumferential outer core portion with a plurality of spaced inwardly radial teeth forming openings for the stator windings. A rotor bearing and sleeve is positioned between rotor sections. The bearing comprises a sleeve which is keyed to rotate with the shaft. The rotor bearing is of such a dimension that its outer diameter (OD) is of slightly less diameter than the inner peripheral diameter of the radial fingers of the laminated plates. On this invention, at least one groove is made in the periphery of the rotor bearing, along with a recess located in the upper and lower sides of the rotor bearing adjacent and in the plane of each groove. A C-shaped spring clip is positioned within each groove so that the upper and lower ends of the C-shaped spring clip are positioned in the respective upper and lower recesses such that the spring clip is, in one position, normally biased outwardly of the rotor bearing OD. In such a position the spring clip will ultimately reside between the radial teeth of the laminated plates and thus will act as a key to prevent rotation of the rotor bearing. The C-shaped spring clip is compressible inwardly within the confines of the groove, which is important during the assembly and disassembly of the shaft carrying rotors and bearings into the stator assembly which is secured within the motor housing.

BRIEF DESCRIPTION OF THE DRAWINGS

FIG. 1 is an elevational view of the submersible motor of this invention.

FIG. 2 is a longitudinal partial sectional view taken along the lines 2—2 of FIG. 1.

DETAILED DESCRIPTION OF THE DRAWINGS

Before explaining the present invention in detail, it is to be understood that the invention is not limited in its application to the details of the construction and arrangement of parts illustrated in he accompanying drawings. The invention is capable of other embodiments and of being practiced or carried out in a variety of ways. It is to be understood that the phraseology and terminology employed herein is for the purpose of description and not of limitation.

Figure 3:
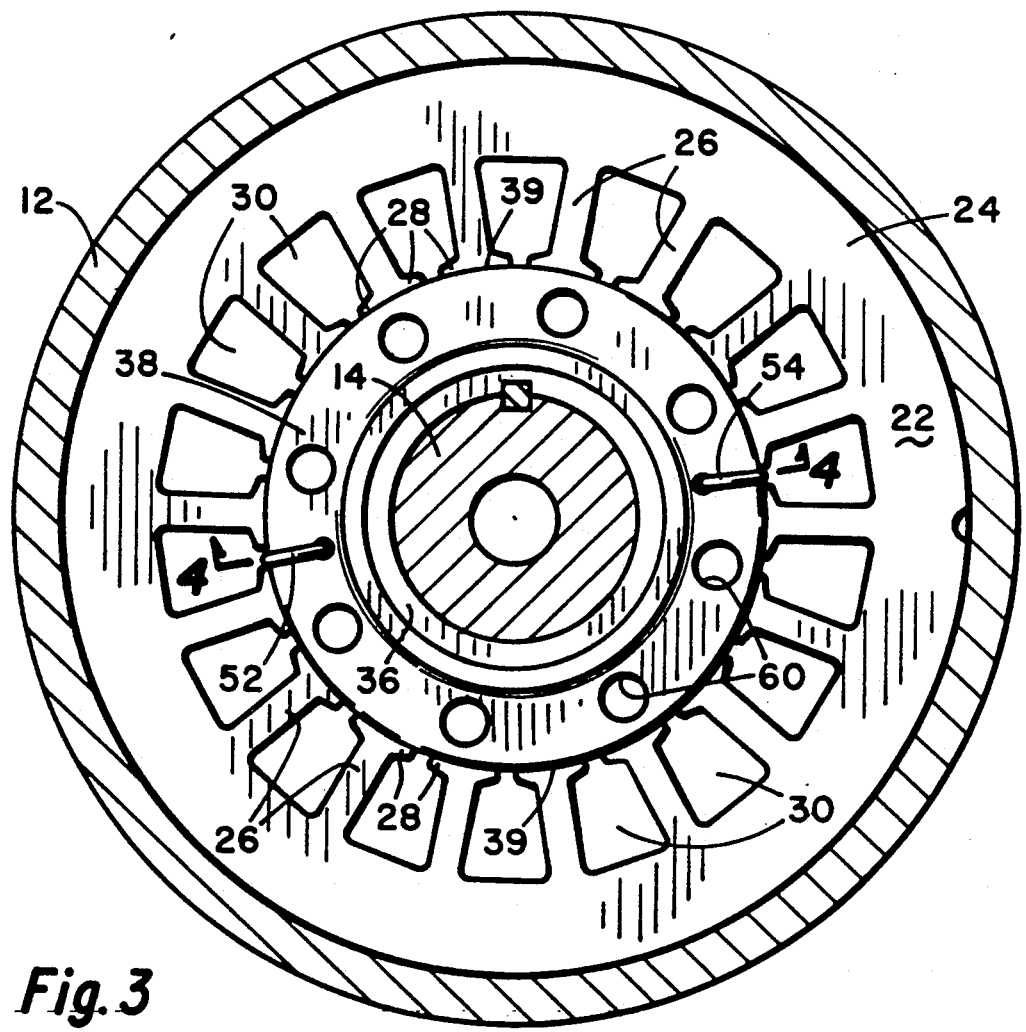
FIG. 3 is a sectional view taken along the lines 3—3 of FIG. 2.

Referring now to FIGS. 1 and 2, the concepts of the invention are disclosed. The submersible electric motor, generally identified by the numeral 10, includes a substantially oil-filled housing 12. Within the housing is a shaft 14 which is rotatably supported by appropriate bearings therein. A plurality of rotors, in this instance two, identified by the dashed lines 16 and 18 are attached to the shaft. A longitudinal stator section 20 extends the full length of all of the rotors and is attached to the housing. The stator comprises a plurality of stacked laminated plates 22 (see FIG. 3). Referring to FIGS. 2 and 3, it is shown that each plate 22 comprises a circumferential outer ring 24 with a plurality of spaced inwardly radial teeth 26 which terminate inwardly with flange-like projections 28. These teeth define openings 30 to receive the stator windings, not shown.

Figure 4:
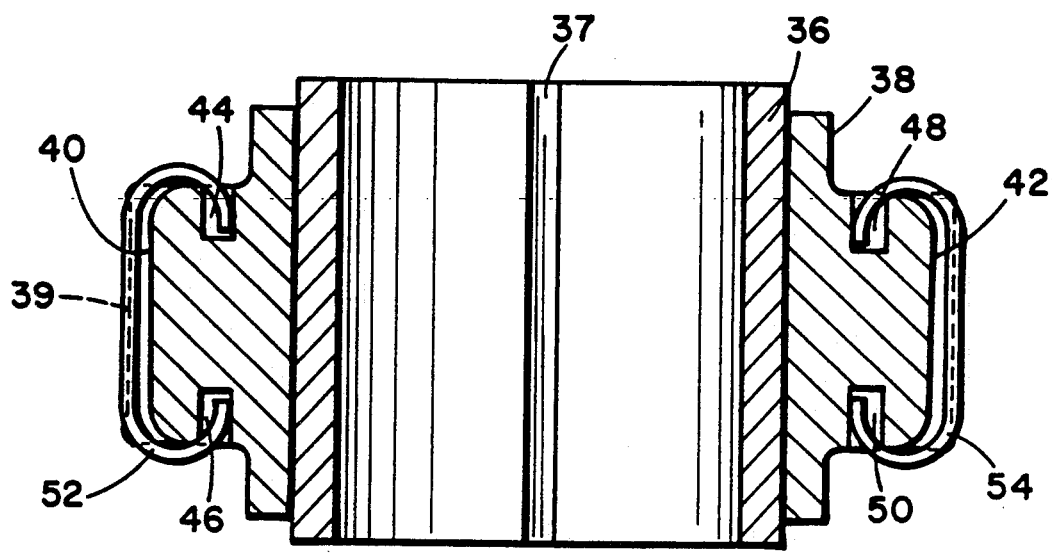
FIG. 4 is a sectional view taken along the lines 4—4 of FIG. 3.

Referring now to FIGS. 2, 3, and 4, they describe a rotor bearing and sleeve generally designated by the numeral 34 which consists of sleeve 36 which is keyed at 37 to rotate with the shaft relative to the outer bearing 38. The outer diameter of the bearing 38 is slightly less than the inner peripheral diameter of the radial teeth 26-28 of the stacked laminated plates of the stator. At least one groove 40 is provided in the outer diameter 39 of the rotor bearing. On the upper and lower side of the bearing are respective recesses 44 and 46 and 48 and 50 which are adapted to receive respective C-shaped spring clips 52 and 54. The grooves 40 and 42 are so designed to permit compression of the C-shaped spring clip such that in one position, as shown in FIG. 4, the clip is normally biased outwardly of the rotor bearing OD 39 and will this act as a key between the radial teeth 26/28 and be prevented from rotation. In another position, the clip is compressible such that the outer portion of the clips 52 and 54 can be totally recessed within the respective grooves 40 and 42 and will not snag or catch against the stacked laminations in the event, during assembly and disassembly of the motor parts, that the clips are not positioned within the space defined by the teeth 26 and 28.

Figure 5:
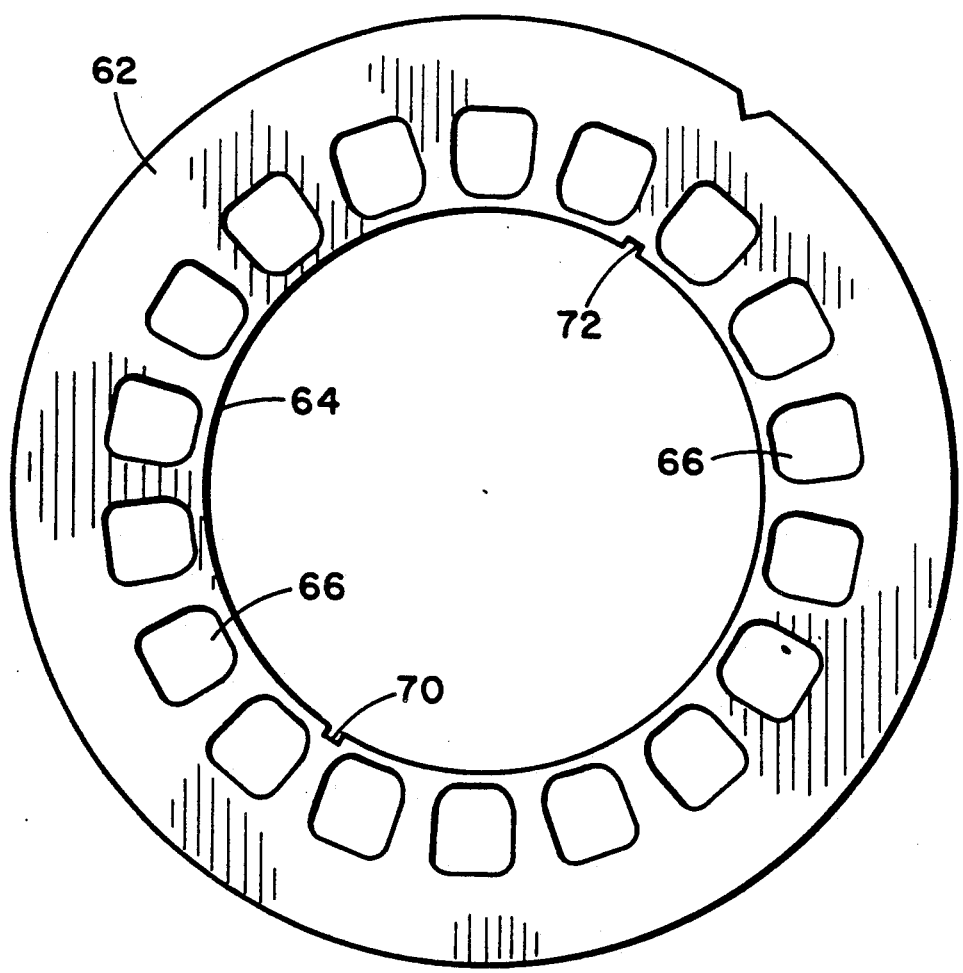
FIG. 5 is a top view of a modified stator ring for use in this invention.

Referring to FIG. 5, there is shown a stator lamination 62 having a circumferential inner ring 64 rather than teeth defining openings as shown in FIG. 3, one or more vertical grooves 70 and 72 are provided in the inner ring 64 of this form of stator to coact with the clips 54. Openings 66 are provided for the windings.

What is claimed:

1. A rotor bearing for positioning between a plurality of spaced rotors in a housed submersible electric motor, said motor having a fixed stator section extending the length of all said rotors, said rotor bearing having at least one external vertical groove that lies within an imaginary radial plane of said rotor bearing, and clip means positioned within and along the length of said groove for yieldable coacting with said stator section to prevent rotary movement of said bearing relative to said stator.

2. The assembly of claim 1 wherein said stator section comprises a plurality of stacked laminated steel plates.

3. The assembly of claim 2 wherein said plates comprise silicon steel.

4. The assembly of claim 1 wherein said positioned within said groove means, to prevent rotary movement of said bearing comprises a normally outwardly biased spring means that interconnects with said stator.

5. The assembly of claim 1 wherein said rotor bearing and said sleeve comprise non-magnetic materials.

6. A rotor bearing for positioning between a plurality of spaced rotors in a housed submersible electric motor, said motor having a fixed stator section extending the length of all said rotors, said rotor bearing having an external vertical groove that lies within a radial plane of said rotor bearing and means aligned with said groove for coacting with said stator section to prevent rotary movement of said bearing relative to said stator, said stator section comprising a plurality of laminated plates each having a circumferential outer core with a plurality of spaced inwardly radial teeth, and the outer diameter (OD) of said rotor bearing being of slightly less diameter than the inner peripheral plane of said radial teeth,
 a recess in an upper and a lower side of said rotor bearing adjacent and in the plane of each said groove,
 a C-shaped spring clip within each said groove wherein upper and lower ends of said C-shaped spring clip are positioned in the respective upper and lower recesses such that such spring clip is in one position normally biased outwardly of the rotor bearing OD and between said radial teeth to prevent rotation of said rotor bearing, and in a second position is compressible inwardly within the confines of said groove.

7. A submersible electric motor comprising
 a substantially oil filled housing;
 a shaft rotatably supported in said housing;
 a plurality of spaced rotors attached to said shaft,
 a stator section extending the length of all of said rotors and surrounding each said rotor, said stator being attached to said housing and comprising of a plurality of stacked laminated plates, each plate comprising a circumferential outer core with a plurality of spaced inwardly radial teeth forming openings for stator windings,
 a rotor bearing positioned between rotors, the outer diameter of said rotor bearing being of slightly less diameter than the inner peripheral diameter of said radial teeth of said laminated plates,
 at least one groove in the OD of said rotor bearing,
 a recess in an upper and a lower side of said rotor bearing adjacent and in the plane of each said groove,
 a C-shaped spring clip within each said groove wherein upper and lower ends of said C-shaped spring clip are positioned in the respective upper and lower recesses such that said spring clip is in one position normally biased outwardly of the rotor bearing OD and between said radial teeth to prevent rotation of said rotor bearing, and in a second position is compressible inwardly within the confines of said groove.

8. The electric motor of claim 7 including a submersible rotary pump connected to said rotary shaft.

9. The electric motor of claim 7 wherein said rotor bearing includes a plurality of longitudinal openings for the flow of oil therethrough.

10. A rotor bearing for positioning between a plurality of spaced rotors in a housed submersible electric motor said motor having a fixed stator section extending the length of said rotors, said stator section having a circumferential inner peripheral ring of slightly greater diameter than the outer diameter (OD) of said rotor bearing and having a vertical groove disposed in said inner peripheral plane, said rotor bearing having:
 a vertical groove in the OD thereof;
 a recess in an upper and a lower side of said rotor bearing adjacent and in the plane of said rotor bearing groove; and
 a C-shaped spring clip having upper and lower ends positioned in said upper and lower recesses respectively such that said spring clip is in one position normally biased outwardly of the rotor bearing OD into said stator groove to prevent rotation of said rotor bearing, and in a second position is compressible inwardly into said vertical groove.

* * * * *